US012717577B2

(12) United States Patent
Bahrami et al.

(10) Patent No.: US 12,717,577 B2
(45) Date of Patent: Aug. 25, 2026

(54) ENRICHING CODE FOR CODE EXPLAINABILITY

(71) Applicant: FUJITSU LIMITED, Kanagawa (JP)

(72) Inventors: Mehdi Bahrami, San Jose, CA (US); Wei-Peng Chen, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 29 days.

(21) Appl. No.: 17/657,601

(22) Filed: Mar. 31, 2022

(65) Prior Publication Data

US 2023/0315442 A1 Oct. 5, 2023

(51) Int. Cl.

| | |
|---|---|
| ***G06F 8/73*** | (2018.01) |
| ***G06F 8/36*** | (2018.01) |
| ***G06F 8/41*** | (2018.01) |

(52) U.S. Cl.
CPC .................. *G06F 8/73* (2013.01); *G06F 8/36* (2013.01); *G06F 8/427* (2013.01)

(58) Field of Classification Search
None
See application file for complete search history.

(56) References Cited

U.S. PATENT DOCUMENTS 9,436,446 B1 * 9/2016 Gupta .................... G06F 8/427
11,327,722 B1 * 5/2022 Bahrami ................ G06F 8/311
11,726,750 B1 * 8/2023 Arcadinho ............... G06F 8/33 717/113
11,875,148 B2 * 1/2024 Makkar .................... G06F 8/71
11,928,156 B2 * 3/2024 Wang ................. G06F 16/9024
2009/0222429 A1 * 9/2009 Aizenbud-Reshef ..... G06F 8/36 707/999.005

(Continued)

OTHER PUBLICATIONS

EPO, Extended European Search Report (EESR) mailed Aug. 28, 2023, in connection with EP Application No. 23154147.5, a foreign counterpart application to U.S. Appl. No. 17/657,601 *Bahrami, M., PyTorrent: A Python Library Corpus for Large-scale Language Models, cited in EESR has already been made of record herein*.

(Continued)

*Primary Examiner* — Jason D Mitchell
(74) *Attorney, Agent, or Firm* — Fujitsu Intellectual Property Center

(57) ABSTRACT

According to an aspect of an embodiment, operations include receiving, as an output of a code generation tool, a file that includes a computer-executable code and a non-executable description. The operations further include modifying blocks of the computer-executable code into modular code blocks and determining a set of trigger conditions from the modified computer-executable code and the non-executable description. The operations further include matching the set of trigger conditions with template conditions in a set of revision rules and determining, based on the match, a set of changes applicable to portions of the modified computer-executable code and the non-executable description. The operations further include updating the modified computer-executable code and the non-executable description based on the set of changes and generating a tutorial-style code file that includes the updated computer-executable code and the updated non-executable description.

18 Claims, 9 Drawing Sheets

(56) References Cited

U.S. PATENT DOCUMENTS

| | | | | |
|---|---|---|---|---|
| 2013/0185700 A1* | 7/2013 | Avrahami | G06F 8/73 | 717/120 |
| 2014/0282403 A1* | 9/2014 | Frenkiel | G06F 8/73 | 717/123 |
| 2019/0114157 A1* | 4/2019 | Makkar | G06F 8/72 | |
| 2019/0317743 A1* | 10/2019 | Cremeans | G06N 20/00 | |
| 2020/0104631 A1* | 4/2020 | Zhang | G06F 40/30 | |
| 2020/0319878 A1* | 10/2020 | Makkar | G06F 8/71 | |
| 2021/0311729 A1* | 10/2021 | Gupta | G06N 3/045 | |
| 2021/0318864 A1 | 10/2021 | Farivar | | |
| 2021/0318865 A1* | 10/2021 | Farivar | G06F 8/73 | |
| 2022/0138266 A1* | 5/2022 | Wang | G06N 3/044 | 707/722 |
| 2023/0106226 A1* | 4/2023 | Bahrami | G06F 8/73 | 717/110 |
| 2023/0315401 A1* | 10/2023 | Makkar | G06F 8/33 | 717/101 |

OTHER PUBLICATIONS

Heyman Geert, et al. "Natural language-guided programming." Proceedings of the 2021 ACM SIGPLAN International Symposium on New Ideas, New Paradigms, and Reflections on Programming and Software. 2021, arXiv:2108.05198v1 [cs.SE] Aug. 11, 2021.

Wang April Yi, et al. "Themisto: Towards automated documentation generation in computational notebooks." arXiv preprint arXiv:2102.12592v1 [cs.HC] Feb. 24, 2021.

Bahrami, M., et al., "PyTorrent: A Python Library Corpus for Large-scale Language Models," (2021), printout from GitHub repository, https://github.com/fla-sil/PyTorrent, accessed Mar. 31, 2022, 4 pages.

Bahrami, M., et al., "PyTorrent: A Python Library Corpus for Large-scale Language Models," (2021), printout from Zenodo Digital Archive, https://zenodo.org/record/4451357, accessed Mar. 31, 2022, 4 pages.

Bahrami, M., "PyTorrent: A Python Library Corpus for Large-scale Language Models," arXiv:2110.01710v1, preprint, Oct. 4, 2021, 10 pages.

Boisberranger, J., et al., "Fix delete feature names in when refitting on a ndarray (#21389)," (2021), printout from GitHub repository, https://github.com/scikit-learn/scikit-learn/blob/03d78913b/sklearn/ensemble/_forest.py#L1065, accessed Mar. 31, 2022, 55 pages.

"Competitions," printout from Kaggle.com, https://www.kaggle.com/competitions, accessed Mar. 31, 2022, 1 page.

Leuthy, R., "Efficientnet3D with one MRI Type," printout from Kaggle.com, https://kaggle.com/code/rluethy/efficientnet3d-with-one-mri-type/notebook, accessed Mar. 21, 2022, 1 page.

"RSNA-MICCAAI Brain Tumor Radiogenomic Classification," printout from Kaggle.com, featured code competition, https://www.kaggle.com/c/rsna-miccai-brain-tumor-radiogenomic-classification/discussion?sort=recent-comments, accessed Mar. 31, 2022.

Gopal, S., "RSNA-EDA and Preprocessing," printout from Kaggle.com, https://www.kaggle.com/code/shilpagopal/rsna-eda-and-preprocessing?scriptVersionId=71026064, accessed Mar. 31, 2022, 1 page.

Contribution by Kaggle sser Flafuji, "Titanic-EDA/Model-Top Percentile Explained," printout from Kaggle.com, https://www.kaggle.com/code/flafuji/titanic-eda-model-top-percentile-explained/comments, accessed Mar. 31, 2022, 1 page.

EPOA—Office Action of European Patent Application No. 23154147.5 mailed Nov. 15, 2024 [9 pages].

EPOA—European Office Action mailed on Oct. 16, 2025 for European Patent Application No. 23154147.5 (8 pages).

CNOA—Notification of the First Office Action issued Jun. 30, 2026 for Chinese Application No. 202310195540.9, with English translation (27 pages).

* cited by examiner

ENRICHING CODE FOR CODE EXPLAINABILITY

FIELD

The embodiments discussed in the present disclosure are related to a system and method for enrichment of code for code explainability.

BACKGROUND

Automated code generation tools are increasingly being used by students, researchers, and engineers alike to solve various types of engineering and scientific problems. An automated machine learning tool is a form of code generation tool that provides processes that can be used to automate tasks of applying machine learning to real-world problems. For example, an automated machine learning tool may facilitate users in different stages of development of machine learning project(s), i.e. from beginning with a raw dataset to building a machine learning model for deployment. A novice user may use an automated machine learning tool to learn machine learning approaches for processing of data and training a machine learning model. On the other hand, a data-scientist or an expert user may use the automated machine learning tool to improve accuracy of a machine learning model by applying different approaches and varieties of pipeline utilizations. The automated machine learning tool may typically generate a computer-executable code for a given task and dataset provided by the users of the tool.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include receiving a file as output of a code generation tool such as an automated machine learning tool. The file may include a computer-executable code and a non-executable description associated with the computer-executable code. The operations may further include modifying the computer-executable code by transforming blocks of the computer-executable code into modular code blocks and determining a set of trigger conditions from the modified computer-executable code and the non-executable descriptions. The operations may further include matching the set of trigger conditions with template conditions included in a set of revision rules and determining a set of changes based on a set of matched conditions. The set of changes may be applicable to a portion of the modified computer-executable code and a portion of the non-executable description. The operations may further include updating the modified computer-executable code and the non-executable description based on the set of changes and generating a tutorial-style code file that includes the updated computer-executable code and the updated non-executable description.

The object and advantages of the embodiments will be realized and achieved at least by the elements, features, and combinations particularly pointed out in the claims.

It is to be understood that both the foregoing general descriptions and the following detailed descriptions are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
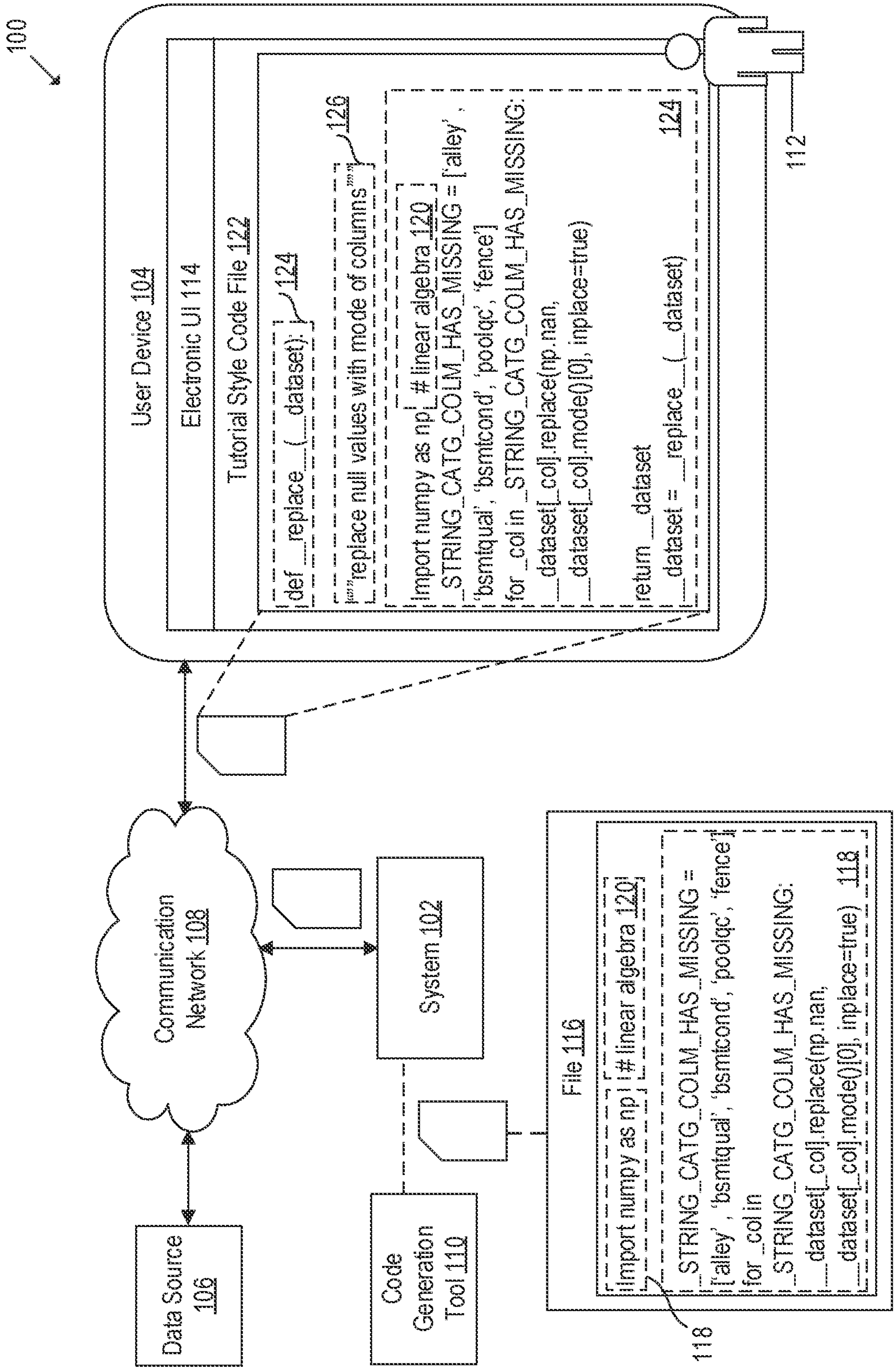
FIG. 1 is a diagram representing an example environment related to enrichment of code for code explainability.

all according to at least one embodiment described in the present disclosure.

DESCRIPTION OF EMBODIMENTS

Some embodiments described in the present disclosure relate to a method and a non-transitory computer-readable medium for enrichment of computer-executable code for code explainability. The present disclosure relates to the enrichment of a code file received from a code generation tool. The enrichment may be achieved by updating computer-executable code in the received code file, adding/updating non-executable descriptions in the received code file, and adding non-executable descriptions (e.g., a natural language description or a tutorial-style description) for the updated computer-executable code. Initially, the computer executable code may be segmented into blocks. The blocks of the computer executable code may be modified by transforming each block into a modular code block. A set of trigger conditions may be determined from the modified computer executable code and the non-executable descriptions. The set of trigger conditions may be matched with template conditions included in a set of revision rules. Based on the match, a set of changes may be determined. Such changes may be applicable to a portion of the modified computer-executable code and a portion of the non-executable descriptions. The modified computer executable code and the non-executable descriptions may be updated based on the set of changes. Further, a tutorial-style code file may be generated, which includes the updated computer-executable code and the updated non-executable descriptions.

Code generation tools are increasingly being used by students, researchers, and engineers alike to solve various types of engineering and scientific problems. An automated machine learning (ML) tool is a form of code generation tool that provides processes that can be used to automate tasks of applying ML to real-world problems. For example, an automated ML tool may facilitate users in different stages of development of ML project(s), i.e., from beginning with a raw dataset to building a ML model for deployment. Users with various levels of expertise in AI/ML may use the automated ML tools to generate computer-executable codes for their projects. As an example, the automated machine learning tool may enable novice artificial intelligence (AI) users to learn about machine learning approaches for designing, building, and deploying an AI/ML model. The automatic machine learning tool may also enable AI experts or researchers (such as data scientists) to improve accuracy of existing AI/ML models by use of approaches and utilization of various pipelines. The approaches may enhance readability of the generated codes and instructions mentioned in the generated codes.

Although the automated ML tool makes ML accessible (to novice users) and saves time and resources typically required in building ML-based solutions for solving complex problems (for experts), the codes generated by use of the ML tools may be abstract at various levels. For instance, some of the automated machine learning tools may include explanations or descriptions for lines of the generated codes. The explanations may greatly aid in minimizing efforts required to comprehend the generated codes. Otherwise, efforts may be required to comprehend the generated codes due to abstract nature of the generated codes). However, in most cases, the explanations for the generated codes may appear limited for novice as well as expert users. For example, explanations, although valuable for a novice AI user, may appear obvious to an expert AI user. The limitedness of the explanations may appear conspicuous, particularly if the explanations do not include observations of the expert or features intended by the expert AI user. For a novice AI user, the explanations may lack details and/or articulation that may be required for developing an understanding of the generated code.

According to one or more embodiments of the present disclosure, the technological field of software development and machine learning may be improved by configuring a system to enrich a code generated by a code generation tool such that users with various levels of expertise in AI are able to take advantage of the codes generated by the code generation tool. The generated code may include computer executable code and non-executable descriptions associated with the computer executable code. The computer executable code and non-executable descriptions may be enriched by means of template conditions and a machine learning model. The template conditions may include a set of rules, where each rule may include one or more of conditions, actions, and values. The set of rules may be produced manually or through an automated rule generator. The system may detect a set of trigger conditions in the computer executable code and may determine a match between the set of trigger conditions and a section of the code file, and may update the code file based on the templates. Thereafter, the system may modify or update the computer executable code in a structured format based on the match. The update may be performed according to content of one or more rules in the set of rules. The machine learning model may generate non-executable description for a given line of computer executable code. The text description may enhance the explainability of the updated computer executable code.

The enriched code may define extensibility of the code generation tool by enabling the users to execute the enriched code on a variety of datasets and on cross-machine learning platforms. The enriched code may result in a tutorial-style code file that enhances both usability and explainability of the code. Compared with existing code generation tools that rely on skill and experience of users in AI and machine learning, the tutorial-style code file generated by the system described in the present disclosure ensures code explainability through modification of the code based on defined rules and explanations of the modified code. The tutorial-style code file can be used by both expert users and non-expert users. The explanations may expand understanding of machine learning models for a given dataset and increase trust in the usage of the machine learning models. The present disclosure may also enable exporting the tutorial-style code file to platforms that host similar tutorial-style code files. The users of those platforms may view and execute the tutorial-style code file.

Embodiments of the present disclosure are explained with reference to the accompanying drawings.

FIG. 1 is a diagram representing an example environment related to enrichment of code for code explainability, arranged in accordance with at least one embodiment described in the present disclosure. With reference to FIG. 1, there is shown an example environment 100. In the example environment 100, there is shown a system 102, a user device 104, a data source 106, and a communication network 108. The system 102 and the user device 104 may be communicatively coupled to each other via the communication network 108. Similarly, the system 102 and the data source 106 may be communicatively coupled to each other via the communication network 108. There is further shown a user 112 who may be associated with the user device 104.

The system 102 may include suitable logic, circuitry, and interfaces that may be configured to enrich a computer-executable code and associated text (i.e., a non-executable description) generated by a code generation tool. The system 102 may receive an exemplary file 116 from a code generation tool 110. The received file 116 may include an exemplary computer-executable code 118 and an exemplary non-executable description 120 (e.g., a natural language description in the form of annotation or a brief comment) associated with the exemplary computer-executable code 118.

The code generation tool 110 may be a software executable on a remote system (e.g., a server that can generate the file 116) or may be included in the system 102 (as a software installed on the system 102). The system 102 may be configured to render an electronic user interface (UI) 114 on the user device 104. For example, the electronic UI 114 may be an UI of a web-browser. The system 102 may be further configured to generate an exemplary tutorial style code file 122 that includes exemplary updated computer-executable code 124 and the exemplary updated non-executable description 126. Upon generation, the system 102 may transmit the tutorial style code file 122 to the user device 104 and the tutorial style code file 122 may be rendered on the electronic UI 114 on the user device 104.

Examples of the system 102 may include, but are not limited to, a mobile device, a desktop computer, a laptop, a computing device, a mainframe machine, a server such as a cloud server, and a group of servers. In one or more embodiments, the system 102 may include a user-end terminal device and a server communicatively coupled to the user-end terminal device. The system 102 may be implemented using hardware including a processor, a microprocessor (e.g., to perform or control performance of one or more operations), a field-programmable gate array (FPGA), or an application-specific integrated circuit (ASIC). In some other instances, the system 102 may be implemented using a combination of hardware and software.

The user device 104 may include suitable logic, circuitry, and interfaces that may be configured to render the tutorial style code file 122 based on commands received from the system 102. Examples of the user device 104 may include, but not limited to, a computing device, a desktop, a personal computer, a laptop, a computer workstation, a display monitor or a computer monitor, a tablet, a smartphone, a cellular phone, a mobile phone, or a consumer electronic (CE) device.

The data source 106 include suitable logic, circuitry, and interfaces that may be configured to store information that may be retrieved by the system 102 to update the computer-executable code 118 and the non-executable description 120. The information may include, for example, code packages comprising Application programming Interface (API) calls, a plurality of tutorial-style code files associated with one or more online coding competitions, baseline tutorial-style code templates, and the like. Examples of the data source 106 may include, but are not limited to, webserver, a database server, a web-based code repository (e.g., GitHub®), and a fileserver.

In operation, the system 102 may segment the received file 116 into a plurality of blocks. The blocks may include one or more lines of code, which may include computer-executable code, non-executable description, or a combination of both computer-executable code and non-executable description. As depicted in FIG. 1, the file 116 may include the computer-executable code 118 and the non-executable description 120 in the form of comments.

The system 102 may modify the computer-executable code 118 by transforming blocks of the computer-executable code into modular code blocks. By way of example, and not limitation, the transformation may include representing content of each of the blocks as one or more of a function call, a function description/code, or one or more parameters of a function definition. As depicted in FIG. 1, a function '_replace_( )' may be used to transform content (i.e., code) in a block of the computer-executable code 118. The transformed block may include the content as part of a function '_replace_( )' and a call to the function '_replace_( )'. The dataset may be passed as a parameter to the function '_replace_( )'. The content of the computer-executable code 118 may be represented using a function '_replace', a function description that returns one or more values for a dataset in the computer-executable code 118 ('_dataset'), and a function parameter '_dataset'. As depicted in FIG. 1, the system 102 may modify the computer-executable code 118 to include a function call and a function description. This may lead to inclusion of lines of code 'def_replace_ (_dataset)', 'return_dataset', and '_dataset=_replace_ (_dataset). Further, a text description the """"replace null values with modes of columns"""" may be generated. The modular code blocks, which are transformations of the computer-executable code 118, may be updated based on a set of changes to obtain the updated computer-executable code 124.

The system 102 may determine a set of trigger conditions from the modified computer-executable code and the non-executable description. The trigger conditions may include one or more of, for example, variables, keywords, function calls, function parameters, decorators, Unicode text, software package names, and the like. In some embodiments, the set of trigger conditions may be determined directly from the computer-executable code 118. As depicted in FIG. 1, the system 102 may determine a variable "STRING_CATG_ COLM_HAS_MISSING" as a trigger condition. The variable may refer to a dataset that is represented as an array or a data frame in the computer-executable code 118. The dataset may include a plurality of parameters viz., 'alley', 'bsmtqual', 'bsmtcond', 'poolqc', and 'fence' of a column. The values corresponding to each of the plurality of parameters may be missing.

The system 102 may match the set of trigger conditions with template conditions included in a set of revision rules. The set of revision rules may be stored in a template file. Each rule of the set of revision rules may include a template condition and a value corresponding to the template condition. The system 102 may detect whether a trigger condition, determined in a first line of code in the computer-executable code 118, matches with one of the template conditions in the set of revision rules. In some embodiments, if a matching is found, the value corresponding to the template condition is identified. In these or other embodiments, the value may correspond to a second line of code or a text description to be injected before the first line of code or after the first line of code.

In some embodiments, the value may correspond to one or more operations to be performed on the first line of code using one or more second lines of code. Such operations on the first line of code may include, for example, a deletion of the first line of code, a replacement of the first line of code with the one or more second lines of code, an operation to append the one or more second lines of code prior to the first line of code or after the first line of code, an operation to insert the one or more second lines of code prior to the first line of code or after the first line of code, and the like.

The system 102 may determine a set of changes that may be applicable to a portion of the modified computer-executable code (obtained via transformation of the blocks of the computer-executable code 118) and a portion of the non-executable description 120. The set of changes may be determined based on a match or matches between the set of trigger conditions and the template conditions included in the set of revision rules. In accordance with an embodiment, the set of changes may correspond to the values that may be identified by matching the set of trigger conditions with the template conditions.

The system 102 may update the modified computer-executable code and the non-executable description 120, based on the set of changes. The set of changes may be applied to the modified computer-executable code and the non-executable description 120. In some scenarios, the system 102 may only update the modified computer-executable code.

The system 102 may generate a tutorial-style code file 122 that includes the updated computer-executable code 124 and the updated non-executable description 126. By way of example, and not limitation, the tutorial-style code file 122 may be a notebook interface (or a computational notebook) with multiple cells. Each cell can be formatted to accept a portion of the updated computer-executable code 124 or a portion of the updated computer-executable code 124 as a markdown. As depicted in FIG. 1, the tutorial-style code file 122 includes the modified computer-executable code (represented as the updated computer-executable code 124) and the generated text description (represented as the updated non-executable description 126 replace null values with mode of columns).

It should be noted here that the communication between the system 102 and the user device 104, and the system 102 and the data source 106, may be performed via the communication network 108. The communication network 108 may include a communication medium through which the system 102 may communicate with the user device 104. Examples of the communication network 108 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof Modifications, additions, or omissions may be made to the system 102 without departing from the scope of the present disclosure.

Figure 2:
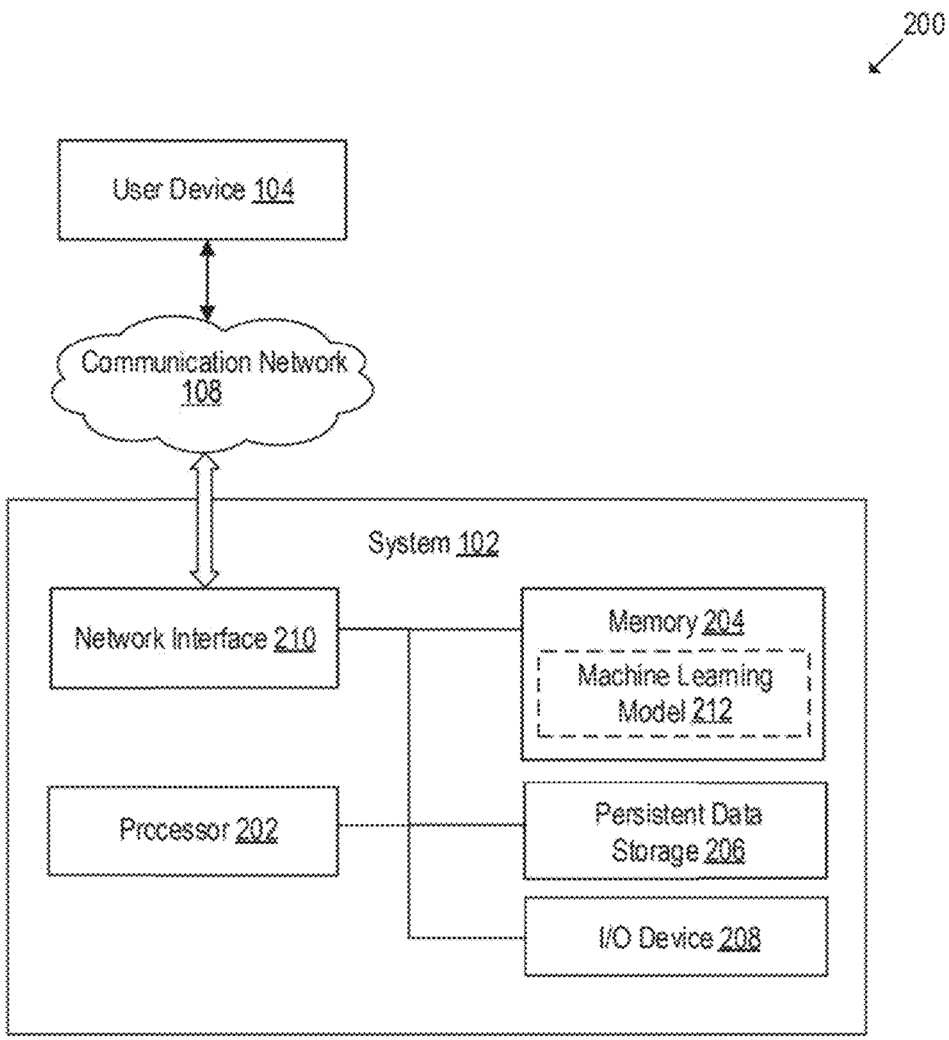
FIG. 2 is a block diagram that illustrates a system for enriching code for code explainability.

FIG. 2 is a block diagram that illustrates a system for enriching code for code explainability, arranged in accordance with at least one embodiment described in the present disclosure. FIG. 2 is explained in conjunction with elements from FIG. 1. With reference to FIG. 2, there is shown a block diagram 200 of the system 102 of FIG. 1. The system 102 may include a processor 202, a memory 204, a persistent data storage 206, an input/output (I/O) device 208, a network interface 210, and a machine learning model 212. There is further shown the user device 104 communicatively coupled to the system 102, via the communication network 108.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device, including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure. Additionally, one or more of the processors may be present on one or more different electronic devices, such as different servers.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a Graphical Processing Unit (GPU), a Central Processing Unit (CPU), a Reduced Instruction Set Computer (RISC) processor, an Application-Specific Integrated Circuit (ASIC) processor, a Complex Instruction Set Computer (CISC) processor, a co-processor, and/or a combination thereof.

The memory 204 may include suitable logic, circuitry, and/or interfaces that may be configured to store program instructions executable by the processor 202. In certain embodiments, the memory 204 may be configured to store the file 116 received from the code generation tool 110, the set of revision rules, the set of changes, the updated modified computer-executable code and non-executable description, and the generated tutorial-style code file 122. In certain embodiments, the memory 204 may include a machine learning model 212. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202, and the template conditions included in the set of revision rules. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive a user input. The I/O device 208 may be further configured to provide an output in response to the user input. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display device and a speaker. 100471 The network interface 210 may include suitable logic, circuitry, interfaces, and/or code that may be configured to establish a communication among the system 102, and the user device 104, via the communication network 108. The network interface 210 may be implemented by use of various known technologies to support wired or wireless communication of the system 102, via the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

In certain embodiments, the system 102 may be divided into a front-end subsystem and a backend subsystem. The front-end subsystem may be solely configured to receive requests/instructions from the user device 104, one or more of third-party servers, web servers, client machine, and the backend subsystem. These requests may be communicated back to the backend subsystem, which may be configured to act upon these requests. For example, in case the system 102 includes multiple servers, few of the servers may be front-end servers configured to relay the requests/instructions to remaining servers associated with the backend subsystem.

The machine learning model 212 may be a trained to generate, based on a training dataset, non-executable descriptions for the updated computer-executable code or update content of the set of changes applicable on the non-executable description in the file 116. The machine learning model 212 may be defined by its hyper-parameters, for example, number of weights, cost function, input size, number of layers, and the like. The parameters of the machine learning model 212 may be tuned and weights may be updated, so as to move towards a global minimum of a cost function for the machine learning model 212. After several epochs of the training on the feature information in the training dataset, the machine learning model 212 may be trained to output a prediction result (text description) for lines of code in the modified computer executable code.

The machine learning model 212 may include electronic data, which may be implemented as, for example, a software component of an application executable on the system 102. The machine learning model 212 may rely on libraries, external scripts, or other logic/instructions for execution by a processing device, such as the processor 202. The machine learning model 212 may include code and routines configured to enable a computing device, such as the processor 202, to generate the text descriptions. Additionally, or alternatively, the machine learning model 212 may be implemented using hardware including a processor, a microprocessor (e.g., to perform or control performance of one or more operations), a field-programmable gate array (FPGA), or an application-specific integrated circuit (ASIC). Alternatively, in some embodiments, the machine learning model 212 may be implemented using a combination of hardware and software.

Modifications, additions, or omissions may be made to the system 102, without departing from the scope of the present disclosure. For example, in some embodiments, the system 102 may include any number of other components that may not be explicitly illustrated or described.

Figure 3:
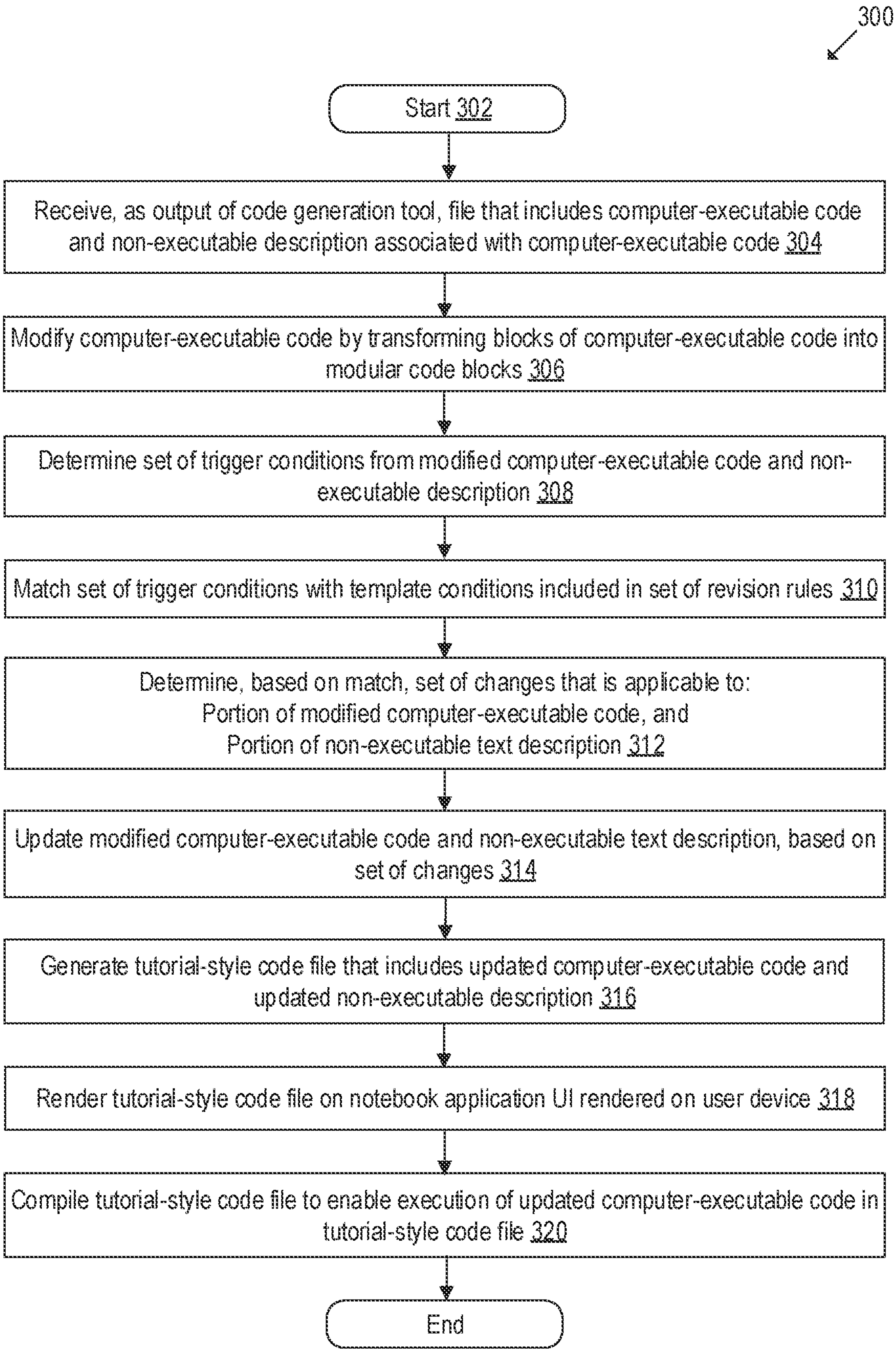
FIG. 3 illustrates a flowchart of an example method of enrichment of code for code explainability.

FIG. 3 illustrates a flowchart of an example method of enrichment of code for code explainability, according to at least one embodiment described in the present disclosure. FIG. 3 is explained in conjunction with elements from FIG. 1 and FIG. 2. With reference to FIG. 3, there is shown a flowchart 300. The method illustrated in the flowchart 300 may start at 302 and may be performed by any suitable system, apparatus, or device, such as by the system 102 of FIG. 1 or FIG. 2.

At 304, a file may be received as an output of a code generation tool. The file may include a computer-executable code and a non-executable description (e.g., a natural language description) associated with the computer-executable code. In accordance with an embodiment, the processor 202 may be configured to receive the file from the code generation tool 110.

By way of example, and not limitation, the code generation tool 110 may be a machine learning code generation software that, when executed, generates the file. Contents of the file may be written in any programming language, such as Python, Java®, JavaScript, or C/C++. The computer-executable code of the file may be associated with a machine learning task. The non-executable description may correspond to static comments or annotations associated with respective portions of the computer-executable code. An example portion of the file in Python is provided as follows:

```
1.  #*** GENERATED PIPELINE***
2.  —
3.  # LOAD DATA
4.  import pandas as pd
5.  _train_dataset=pd.read_csv(“/AutoML/Autotask/split_datasets/prices/3/u
6.  _test_dataset=pd.read_csv(“/AutoML/Autotask/split_datasets/prices/3/us
7.  _dataset=pd.concat([_train_dataset, _test_dataset],axis=0).reset_index
8.  —
9.  # DISCARD IRRELEVANT COLUMNS
```

For sake of brevity, only nine (9) lines of the exemplary file have been mentioned. The received file includes computer-executable code (lines 4, 5, 6, and 7) and non-executable description (lines 1, 3, and 9). The computer-executable code of the file may be associated with a machine learning task that requires a training dataset and test dataset. The non-executable description (lines 1, 3, and 9) are static comments associated with the computer-executable code (lines 4, 5, 6, and 7).

The processor 202 may be further configured to segment the computer-executable code 118 into a plurality of blocks. The following are exemplary blocks obtained via segmentation of the file:

TABLE 1

Blocks of a computer executable code

| Block Index | Block Content |
| --- | --- |
| 0 | (['# Generated pipeline by SML', '### Generated at: {2021-07-13 09:44 : ... |
| 1 | (['# *** GENERATED PIPELINE *** ', ''], 'code') |
| 2 | (['# Now let's load data'], 'markdown') |
| 3 | (['# LOAD DATA', 'import pandas as pd', '_train dataset = pd.read_csv .... |
| 4 | (['# DISCARD IRRELEVANT COLUMNS', '_dataset.drop([ ], axis=1, inplace = .... |
| 5 | (['# PREPROCESSING-1', 'import numpy as np', '_STRING_CATG_COLM_HAS_MI ... |
| 6 | (['# PREPROCESSING-2', 'NUM COLM HAS MISSING = ['LotFrontage', 'Mas ... |
| 7 | (['# PREPROCESSING-3', 'from sklearn.preprocessing import StandardScal ... |
| 8 | (['# PREPROCESSING-4', 'from sklearn import preprocessing',_ STRING_C... |
| 9 | (['# DETACH TARGET', '_feature = _dataset.drop(['Saleprice'], axis=... |

-continued

```
import pandas as pd
_—train_dataset = pd.read_csv(_—training path, delimiter= ',')
_—test_dataset = pd.read_csv(_—test path, delimiter= ',')
return _—train_dataset, _—test_dataset
```

At 306, the computer-executable code may be modified by transforming each of the plurality of blocks of computer-executable code into modular code blocks. In accordance with an embodiment, the processor 202 may be configured to modify the computer-executable code by transforming each of the plurality of blocks of the computer-executable code into a modular code block. The blocks of the computer-executable code may be transformed to refractor or revise the computer-executable code based on requirements of the user 112. The transformation of the blocks may require modular block constructions. For example, the blocks of the computer-executable code may be transformed into the modular code blocks by representing content of each of the blocks through a function call, a function description/code, or one or more parameters of a function definition. For example, different datasets present in the computer-executable code may be submitted to a module (for example, a Python function) to preprocess the datasets with an approach that is similar to processing of parameters by the Python function. Considering a portion of the computer-executable code mentioned at 304, the processor 202 may call '_load_data' module (a Python function) to preprocess the datasets '_training_path' and '_test_path' (present in the computer-executable code) as per the '_load_data' module. Considering the exemplary received file mentioned in 304, the computer-executable code (lines 4, 5, and 6) and the non-executable description (line 3) may be transformed into a modular block as follows:

```
def _—load_data(_—training path, _—test_path, concat = false):
  ***load data as input dataset
  params: _—training path: the training path of input dataset
  params: _—test path: the path of test dataset
  params: if it is true then it will concatenate the training dataset and the
  test dataset as output
returns: generate final loaded dataset as dataset, input and test ***
#LOAD DATA
```

-continued

```
_—train_dataset, _—test_dataset = _—load_data(_—training path,
_—test_path, concat = true)
train_dataset.head( )
```

In the above-mentioned modular block, the content of the exemplary received file (lines 4, 5, and 6) is represented as a code of the '_load_data' module (function). '_—train_dataset', and '_test_dataset' may be represented as parameters of the '_load_data' module (function). The '_load_data' module can be called with different input parameters, such as, '_training path', '_test_path', and 'concat=true'. The processor 202 may call the '_load_data' module from other Python functions as well.

At 308, a set of trigger conditions may be determined from the modified computer-executable code (modular code blocks) and the non-executable description. In accordance with an embodiment, the processor 202 may be configured to determine the set of trigger conditions from the modified computer-executable code and the non-executable description. By way of example, and not limitation, the set of trigger conditions may include one or more of variables, keywords, function calls, function parameters, decorators, Unicode text, and software package names. For example, a presence of keywords such as 'BEGIN', 'DETACH TARGET', 'LOAD DATA', 'MODEL', 'TRAIN TEST SPLIT', or 'PREPROCESSING-number', in the modified computer-executable code may be determined as trigger conditions. Similarly, a presence of variables such as 'y_pred', '_STRING_CATG_COLM_HAS_MISSING', '_feature', '_target', '_NUM_COLM_HAS_MISSING', '_num_of_training_instances', or '_lgbmregressor=LGBMRegressor( )' in the modified computer-executable code may be determined as trigger conditions. A presence of function calls such as '_model=RandomForestClassifier( )', or '_model=CatBoostRegressor( )' in the modified computer-executable code may be determined as trigger conditions.

In accordance with an embodiment, the set of trigger conditions may be determined based on an Abstract Syntax Tree (AST) of the modified computer-executable code and the non-executable description. The processor 202 may be configured to generate the AST by parsing lines of the modified computer-executable code and the non-executable description. By processing nodes of the AST, he processor 202 may be further configured to determine one or more of variables, keywords, function calls, function parameters, decorators, Unicode text, and software package names. The set of trigger conditions may be determined based on the determined variables, keywords, function calls, function parameters, decorators, Unicode text, and software package names.

At 310, the set of trigger conditions may be matched with template conditions included in the set of revision rules. The processor 202 may be configured to match the determined set of trigger conditions with the template conditions. In accordance with an embodiment, the set of revision rules may correspond to a template file that includes the template conditions as keywords or text description, and values corresponding to the keywords and text descriptions. An exemplary template file is shown as follows:

TABLE 2

| Set of revision rules | |
|---|---|
| Keyword | Value |
| # BEGIN | [[ '# Use a generic dataset path to start'], [ ]] |
| # DETACH TARGET | [[ ], [ ]] |
| # LOAD DATA | [[ '# Now let's load data'], [ ]) |
| # MODEL | [[ '# Train a model'], [ ]] |
| # TRAIN TEST SPLIT | [[ '# Feature Engineering'], [ ]] |
| # PREPROCESSING-number | [[ '# Split Train/Test'], [ ]] |
| # ***GENERATED PIPELINE*** | [[ '# Generated pipeline by SML'], [ ]] |

The processor 202 may be configured to determine whether the set of trigger conditions match keywords or text descriptions in the exemplary template file.

In accordance with another embodiment, the set of revision rules may correspond to a template file that includes the template conditions as variables, function calls, or function parameters. The template file may also include values corresponding to the template conditions, where the values may be function names, i.e., names of functions that need to be called. An exemplary template file is shown as follows:

```
FUNCTION MAPPING = {
'_—STRING_CATG_COLM_HAS_MISSING' :
'_—missing_data_—',
'_—NUM_COLM_HAS_MISSING' : '_—num_missing_—',
'_—STRING_CATG_COLM_NO_MISSING' : '_—cat_missing_—',
'_—target' = _—dataset[' : '_— target dataset_—',
'_—num_of_training_instances' : '_—num_of_training_instances',
'_—lgbmregressor = LGBMRegressor( )' : '_—LGBMRegressor_—',
```

The processor 202 may be configured to determine whether the set of trigger conditions matches the variables, function calls, or function parameters in the exemplary template file. The processor 202 may be configured to process the blocks of the modified computer-executable code and distinguish the purpose of each block. If a line of code starts with a matched template condition, then a corresponding function may be fired. The processor 202 may be configured to call a function (represented as a value in the set of revision rules) if a trigger condition of the set of trigger conditions is determined to match a template condition (represented as a variable, a function call, or a function parameter in the set of revision rules) in the modified computer-executable code.

In accordance with an embodiment, the set of revision rules may correspond to a template file that includes the template conditions as keys, and values corresponding to the keys (template conditions) as one or more operations and one or more lines of code. The processor 202 may be configured to determine one or more keys in the modified computer-executable code as trigger conditions of the set of trigger conditions. Further, the determined keys may be matched with the keys included as template conditions in the set of revision rules. Further details about the matching of the determined keys are described, for example, in FIG. 4.

At 312, a set of changes may be determined based on the match. The processor 202 may be configured to determine, based on the match, the set of changes applicable to a portion of the modified computer-executable code and a portion of the non-executable description. In accordance with an embodiment, the set of changes comprises a selection of a subset of the template conditions that matches with the set of trigger conditions. The subset of the template conditions may be selected from the template file that includes the template conditions.

If the template file includes the template conditions as keywords or as text descriptions, then a search operation may be executed to identify a subset of values corresponding to the subset of template conditions. The processor 202 may be configured to execute the search operation in the template file to identify the subset of values corresponding to the subset of template conditions. The search operation may be executed if a match is determined between the subset of template conditions and the set of trigger conditions. The subset of values may include one or more code fragments or non-executable descriptions for the modular code blocks of the modified computer-executable code.

With reference to the template file (i.e. the revision rules) of Table 2, the selected subset of template conditions may include a keyword 'BEGIN', and a text description *GENERATED PIPELINE*. The keyword 'BEGIN' (in the modified computer-executable code) and the text description *GENERATED PIPELINE* (in the non-executable description) may be determined as the set of trigger conditions. Thereafter, the processor 202 may select the keyword 'BEGIN' and the text description *GENERATED PIPELINE* as a subset of template conditions that matches with the determined set of trigger conditions. The search operation may result in identification of "# Use a generic dataset path to start" and "# Generated pipeline by SML" as a subset of values. "# Use a generic dataset path to start" may correspond to the template condition 'BEGIN' and "# Generated pipeline by SML" may correspond to the template condition *GENERATED PIPELINE*. The set of changes may, therefore, include addition of line comments, i.e., "# Use a generic dataset path to start" and "# Generated pipeline by SML".

If the template file includes the template conditions as variables, function calls, or function parameters, then a search operation may be executed to identify functions corresponding to the template conditions. For example, variables '_STRING_CATG_COLM_NO_MISSING', and '_NUM_COLM_HAS_MISSING' may be detected as the set of trigger conditions in the modified computer-executable code. As the variables match template conditions '_STRING_CATG_COLM_NO_MISSING' and '_NUM_COLM_HAS_MISSING' in the template file, the processor 202 may select the variables '_STRING_CATG_COLM_NO_MISSING' and '_NUM_COLM_HAS_MISSING' as a subset of template conditions. Thereafter, the processor 202 may be configured to execute a search operation to identify values corresponding to these variables in the template file. The identified values may be referred to as a subset of values, such as a function '_cat_missing_' (corresponds to '_STRING_CATG_COLM_NO_MISSING',) and a function '_num_missing_' (corresponds to '_NUM_COLM_HAS_MISSING'). The processor 202 may call the functions '_cat_missing_' and '_num_missing_' upon determination of the set of trigger conditions in the modified computer-executable code.

In accordance with an embodiment, the set of changes may include one or more operations to be performed on a line of code in the modified computer-executable code. The processor 202 may be configured to select the line of code after determining a trigger condition in the line of code. The trigger condition may be referred to as a key in the selected line of code. The processor 202 may determine a key (i.e., as a template condition) that matches with the trigger condition in the template file and may identify a value corresponding to the matching template condition. The value may include one or more operations to be performed on the selected line of code and one or more lines of code (different from the selected line of code) to be inserted in, replaced from, appended prior to, or appended after the first line of code. Further details about the determination of the set of changes are described, for example, in FIG. 4.

At 314, the modified computer-executable code and the non-executable description may be updated based on the set of changes. The processor 202 may be configured to update the modified computer-executable code and the non-executable description.

In accordance with an embodiment, the processor 202 may update the modified computer-executable code and the non-executable description based on keywords and text description. For example, the set of changes may correspond to values '# Use a generic dataset path to start' and '# Generated pipeline by SML'. The value '# Use a generic dataset path to start' may correspond to the keyword 'BEGIN' (a template condition of the subset of template conditions). The processor 202 may update the non-executable description if the keyword 'BEGIN' is detected as a trigger condition in the non-executable description. For the update, the trigger condition must match the template condition '# BEGIN' in the template file. The update may include injecting the value '# Use a generic dataset path to start' prior to the keyword 'BEGIN' in the modified computer-executable code. The value '# Use a generic dataset path to start' is a pre-block injection content as the value is added prior to the trigger condition. Referring to the set of revision rules (template file) depicted in table 2), the template condition # BEGIN (comment) is corresponds with value [['# Use a generic dataset path to start'], [ ]].

Similarly, the value '# Generated pipeline by SML' may correspond to the text description *GENERATED PIPELINE* (a template condition of the subset of template conditions). The processor 202 may update the non-executable description if the text description *GENERATED PIPELINE* is detected as a trigger condition in the non-executable description. The text description may match with the template condition *GENERATED PIPELINE* in the template file. The update may include injecting the value '# Generated pipeline by SML' prior to the text description *GENERATED PIPELINE* in the non-executable description (Refer to the set of revision rules (template file) depicted in table 2).

In accordance with another embodiment, the processor 202 may update portions of the modified computer-executable code based on function descriptions. The set of changes may correspond to values '_cat_missing_' and '_num_missing_'. For example, the value '_cat_missing_' may be a function that corresponds to a template condition '_STRING_CATG_COLM_NO_MISSING' in the template file. The processor 202 may be configured to call the function '_cat_missing_' upon determination of the variable '_STRING_CATG_COLM_NO_MISSING' as a trigger condition in the modified computer-executable code. The trigger condition may match the template condition '_STRING_CATG_COLM_NO_MISSING' in the template file. The portion of the modified computer-executable code that includes the variable '_STRING_CATG_COLM_NO_MISSING' may be updated with a function description corresponding to the function '_cat_missing_'.

Similarly, the value '_num_missing_' may be a function that corresponds to another template condition '_NUM_COLM_HAS_MISSING' in the template file. The processor 202 may be configured to call the function '_num_missing_' if the variable '_NUM_COLM_HAS_MISSING' is detected as a trigger condition in the modified computer-executable code. The trigger condition may match the template condition '_NUM_COLM_HAS_MISSING' in the template file. The portion of the modified computer-executable code that includes the variable '_—NUM_COLM_HAS_MISSING' may be updated with a function description that corresponds to the function '_num_missing_'.

In accordance with another embodiment, the processor 202 may update a line of code selected from the modified computer-executable code, based on keys included as template conditions in the template file. A key may be a condition for which a value exists in the template file. If a trigger condition in the selected line of code is determined to be matching with a template condition (a key) in the template file, then the selected line of code may be updated based on a value corresponding to the key. The value may include one or more operations to be performed using one or more lines of code.

The processor 202 may update the selected line of code based on a set of changes that corresponds to the value. The selected line of code may be updated via one or more operations performed on the selected line of code using the one or more lines of code included in the value. Further details about updating the selected line of code are described, for example, in FIG. 4.

At 316, a tutorial-style code file may be generated. The processor 202 may be configured to generate the tutorial style code file that includes the updated computer-executable code and the updated non-executable description. An example of the tutorial-style code file is a Jupyter® notebook. The processor 202 may populate a baseline tutorial-style code template with the updated computer-executable code and the updated non-executable description to generate the tutorial-style code file. The updated computer-executable code may represent the computer-executable code in a format that is less abstract and can easily be understood by novice and expert users. The updated non-executable description may enhance explainability of the updated computer-executable code and may improve quality of documentation present in the form of a non-executable description in the received file. An example tutorial style code file is described, for example, in FIG. 8B.

At 318, the tutorial-style _code file may be rendered on a UI of a notebook application. The processor 202 may be configured to render the tutorial-style code file onto the UI of the notebook application. In accordance with an embodiment, the rendered tutorial-style code file may include explanation of the computer-executable code (for example, a machine learning code generated via an automated machine learning tool). The processor 202 may control a display device (for example, the user device 104) to render the generated tutorial-style code file. The notebook application may be an interactive web application that allows a developer (or a user) to view, edit, document/comment on, code, and executing the computer-executable code.

The processor 202 may be configured to export the tutorial-style code file to the notebook application via a kernel wrapper. The kernel wrapper may be used if the notebook application enables execution of computer-executable codes by use of a kernel of the notebook application. The kernel wrapper may wrap around an Application Programming Interface (API) of the notebook application.

At 320, the tutorial-style code file may be compiled to enable execution of the updated computer-executable code included in the tutorial-style code file. The processor 202 may be configured to compile the tutorial-style code file to execute the updated computer-executable code. In accordance with an environment, the processor 202 may compile the updated computer-executable code using a compiler used by the notebook application. In accordance with an embodiment, the processor 202 may convert the tutorial-style code file to a format (e.g., separate executable cells for code and markdown) that is suitable for rendering on the UI of the notebook application.

Control may pass to end. Although the flowchart 300 is illustrated as discrete operations, such as 302, 304, 306, 308, 310, 312, 314, 316, 318, and 320. However, in certain embodiments, such discrete operations may be further divided into additional operations, combined into fewer operations, or eliminated, depending on the particular implementation without detracting from the essence of the disclosed embodiments.

Figure 4:
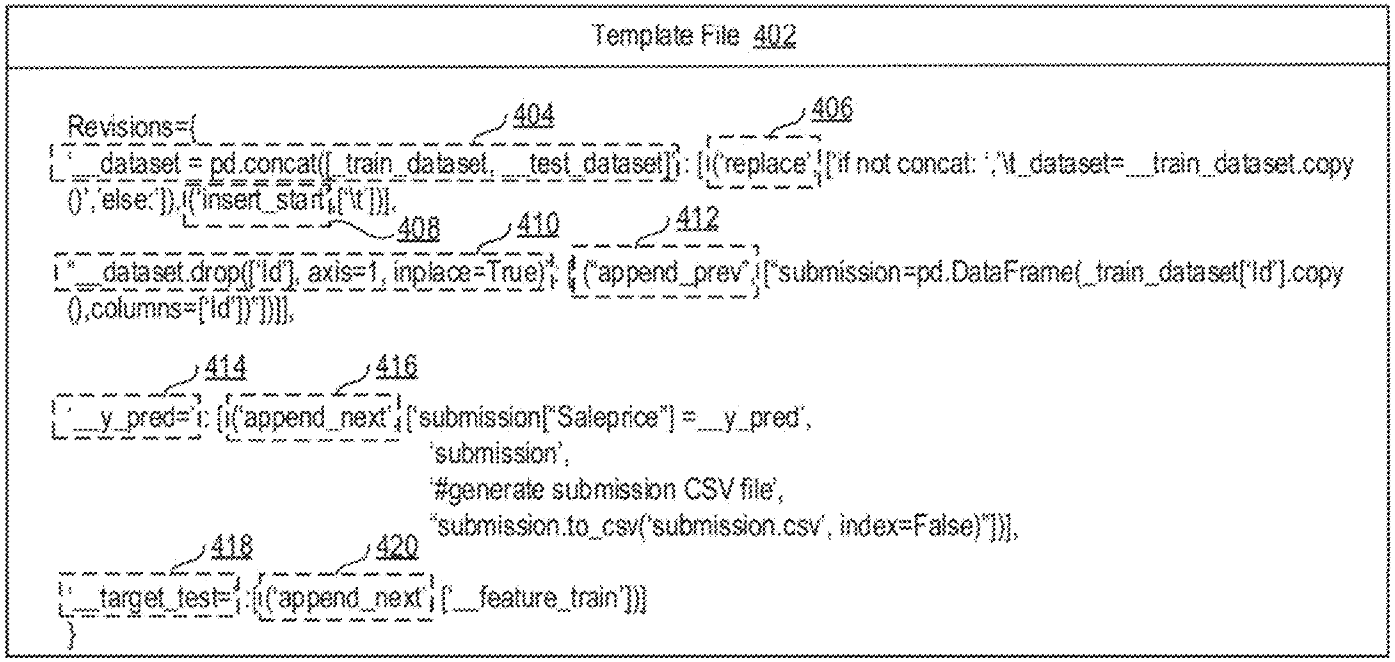
FIG. 4 illustrates an exemplary template file comprising a set of revision rules to be used for updating code.

FIG. 4 illustrates an exemplary template file comprising a set of revision rules to be used for updating code. FIG. 4 is explained in conjunction with elements from FIG. 1, FIG. 2, and FIG. 3. With reference to FIG. 4, there is shown an exemplary template file 402 that includes a set of revision rules. Each rule of the set of revision rules may include a template condition and a value corresponding to the template condition. The template condition may be referred to as a key, and the values corresponding to the key can be an operation (e.g., add, delete, replace, append) that may be performed using one or more lines of code. As shown in FIG. 4, the set of revision rules (i.e., a part of the exemplary template file 402) includes four template conditions. The processor 202 may perform a set of operations to determine trigger conditions in selected lines of code in the modified computer-executable code and match the trigger conditions with template conditions in the exemplary template file 402, as described herein.

The processor 202 may be configured to select a line of code from the modified computer-executable code and determine a trigger condition of a set of trigger conditions in the selected line of code. The processor 202 may match the determined trigger condition with the template conditions (keys) in the set of revision rules. For example, the determined trigger condition may be matched with keys or template conditions, such as:

| |
|---|
| '—dataset = pd.concat ([_—train_dataset,_—test_dataset])' 404, |
| "—dataset.drop(['Id'], axis=1, inplace=True)" 410, |
| '—y_pred =' 414, and |
| '—target_test =' 418. |

The processor 202 may be configured to determine a change of the set of changes based on the match. The set of changes may include operations to be performed on the selected line of code in the modified computer-executable code. In accordance with an embodiment, the processor 202 may be configured to identify the value corresponding to a matching template condition in the exemplary template file 402, if the determined trigger condition is matching with the template condition. The value may include one or more operations to be performed on the selected line of code and/or one or more lines of code to be inserted in the selected line of code.

The processor 202 may update the selected line of code based on the set of changes. For example, if the determined trigger condition in the selected line of code matches with '_dataset=pd.concat ([_train_dataset_test_dataset])' 404, then the corresponding value may be identified as [('replace', ['if not concat: ','\t_dataset=_train_dataset.copy ( )','else:']), ('insert_start', ['\t'])]. The value indicates that replace 406 and insert_start (insert at start) 408 operations need to be performed on the selected line of code. A corresponding change of the set of changes may include an operation to replace ['if not concat: ','\t_dataset=_train_dataset.copy ( )','else:'] from the selected line of code and insert ['\t'] at the start of the selected line of code.

If the determined trigger condition in the selected line of code matches with "_dataset.drop(['Id'], axis=1, inplace=True)" 410, then the corresponding value may be identified as [("append_prev", ["submission=pd.DataFrame (_train_dataset['Id']. copy( ), columns=['Id'])"])]. The value may indicate that append_prev (append previous) 412 operation needs to be performed on the selected line of code. A corresponding change of the set of changes may include an operation to append ["submission=pd.DataFrame(_train_datasetr['Id'].copy( ), columns=['Id'])"] at the start of the selected line of code.

If the determined trigger condition in the selected line of code matches with '_y_pred='414, then the corresponding value may be identified as [('append_next', ['submission ["Saleprice"]=_y_pred', 'submission', '#generate submission CSV file', "submission.to_csv('submission.csv', index=False)"])]. The value may indicate that append_next (append next) 416 operation needs to be performed on the selected line of code. A corresponding change of the set of changes may include an operation to append ['submission ["Saleprice"]=_y_pred', 'submission', '#generate submission CSV file', "submission.to_csv('submission.csv', index=False)"] after the selected line of code.

If the determined trigger condition in the selected line of code matches with '_target_test=' 418, then the corresponding value may be identified as [('append_next', ['_feature_train'])]. The value may indicate that append_next (append next) 420 operation needs to be performed on the selected line of code. A corresponding change of the set of changes may include an operation to append ['_feature_train'] after the selected line of code.

Figure 5:
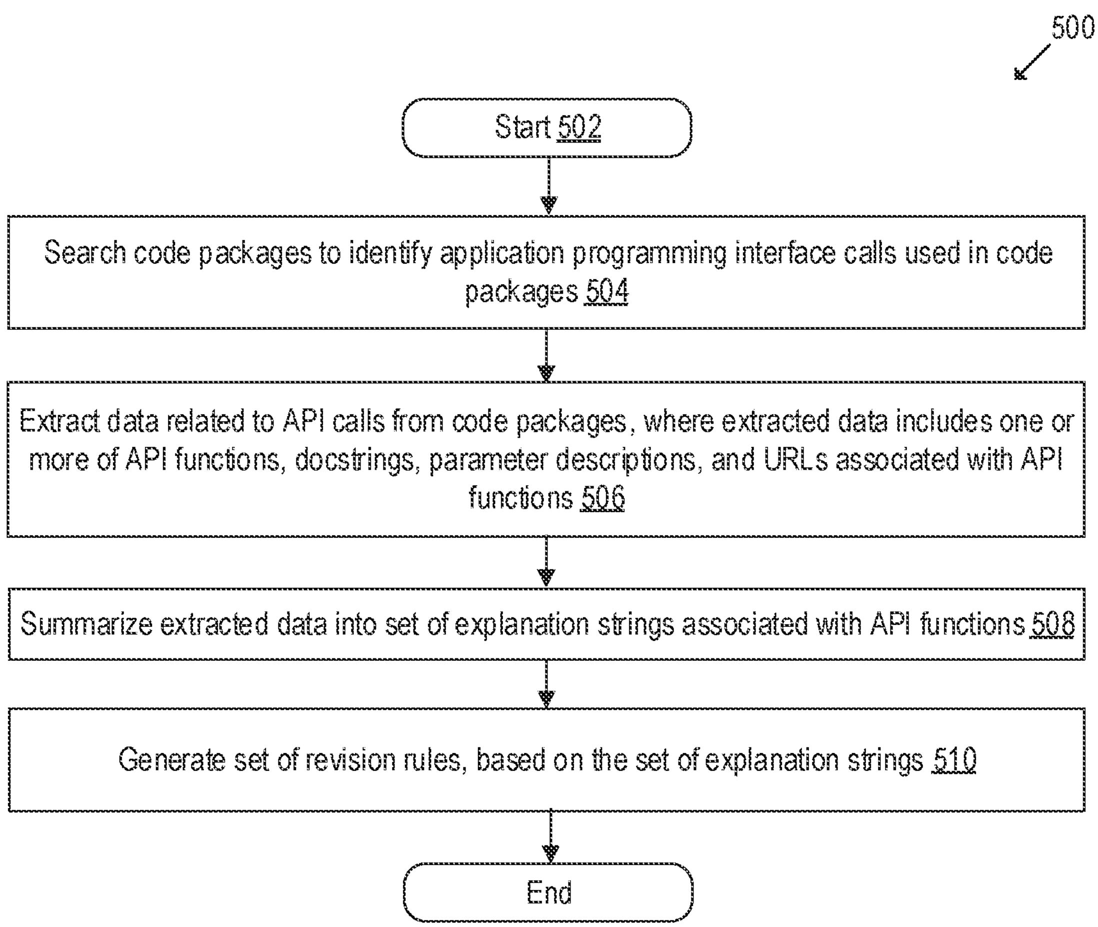
FIG. 5 illustrates a flowchart of an example method for automatic generation of a set of revision rules that may be used for updating code.

FIG. 5 illustrates a flowchart of an example method for automatic generation of a set of revision rules that may be used for updating code, according to at least one embodiment described in the present disclosure. FIG. 5 is explained in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as by the system 102 of FIG. 1 or FIG. 2.

At 504, code packages may be searched to identify API calls used in the code packages. In one or more embodiments, the processor 202 may be configured to search the code packages to identify API calls used in the code packages. The processor 202 may check language sources to access API call information. The language sources may include code libraries. The code libraries may include the code packages to be searched. The code packages may include the API call information. For example, Code libraries such as PyTorrent™ may be accessed for retrieving descriptions of API calls and parameters related to the API calls. The Python libraries may include coding, semantic, and natural language resources, that may be used to update the computer-executable code and the non-executable description for code comprehensibility.

At 506, information related to the API calls may be extracted from the code packages. In one or more embodiments, the processor 202 may be configured to extract the information related to the API calls from the code packages. The extracted information may include one or more of API functions, docstrings, parameter descriptions, and Universal Resource Locators (URLs) associated with the API functions. For example, the processor 202 may be configured to extract information pertaining to an API call "Random Forest Classifier". The information may be extracted from documentations present in one of the searched code packages. The documentations may include an API function 'RandomForestClassifier(ForestClassifier)'.

The documentation of the API call Random Forest Classifier may further include a doctstring "A random forest classifier is a meta estimator that fits a number of decision tree classifiers on various sub-samples of the dataset. The sub-sample size is controlled with the 'max_samples' parameter if 'bootstrap=True' (default), otherwise the whole dataset is used to build each tree". The documentation of the API call Random Forest Classifier may further include parameter descriptions such as 'n_estimators' and 'versionchanged'. The parameter description in the documentation may include "n_estimators: int, default=100, the number of trees in the forest, _versionchanged: 0.22, the default value of "n_estimators changed from 10 to 100 in 0.22". The documentation of the API call Random Forest Classifier may further include an URL associated with API call Random Forest Classifier. The URL included in the description may be 'https://github.com/scikit-learn/scikit-learn/blob/0d378913b/sklearn/ensemble/forest.py#L1065'.

At 508, the extracted data may be summarized into a set of explanation strings associated with the API functions. In one or more embodiments, the processor 202 may be configured to summarize the extracted data into the set of explanation strings associated with the API functions. The processor 202 may generate a summary by use of a language model. For example, the processor 202 may generate a summary that includes a set of explanation strings associated with the API call "Random Forest Classifier". The generated summary may include, for example, "Random Forest Classifier is a meta estimator that fits a number of decision tree classifiers on various sub-samples of the dataset and uses averaging to improve the predictive accuracy and control over-fitting.", "The sub-sample size is controlled with the max_samples parameter if bootstrap=True (default), otherwise the whole dataset is used to build each tree".

At 510, a revision rule of the set of revision rules may be generated based on the set of explanation strings. In one or more embodiments, the processor 202 may be configured to generate the revision rule of the set of revision rules, based on the set of explanation strings. In some embodiments, the processor 202 may be configured to generate the revision rule of the set of revision rules based on explanation text and visualizations. The revision rule may be included in a template file that includes a plurality of template conditions. A template condition in a revision rule may be represented as a template function that corresponds to a value. The value may correspond to one or more operations performed based on the set of explanation strings. For example, a generated revision rule for an operation that uses RandomForestClassifier is shown using a set of explanation text, as follows:

```
elif '_—model = RandomForestClassifier( )' in prev:
added_codes.append((['## Random Forest Classifier',
"We will use 'RandomForestClassifier' which is a meta estimator that fits
a number of decision tree classifiers on various sub-samples of the
dataset."
"The sub-sample size is controlled with 'max_samples' parameter if
'bootstrap=True' (default), otherwise the whole dataset is used to build
each tree."
"More detail can be found [here](https://lskit-learn.org/modules"],
'markdown'))
```

In the generated revision rule, the template condition is ['_model=RandomForestClassifier( )' in prev:]. The processor 202 may apply the generated rule to revise a selected line of code in the modified computer-executable code or the non-executable description. The generated rule may be applied upon determining a trigger condition in the modified computer-executable code or the non-executable description that is matching with the template condition in the generated revision rule. The trigger condition may be a function call "Random Forest Classifier" in the selected line of code.

The processor 202 may be configured to determine a set of changes based on a value corresponding to the template condition ['_model=RandomForestClassifier( )' in prev:]. For example, the value may correspond to an append operation that may have to be performed on the selected line of code to include the set of explanation strings. Thus, the processor 202 may be configured to update the selected line of code by appending "['## Random Forest Classifier', "We will use 'RandomForestClassifier' which is a meta estimator that fits a number of decision tree classifiers on various sub-samples of the dataset." "The sub-sample size is controlled with 'max_samples' parameter if 'bootstrap=True' (default), otherwise the whole dataset is used to build each tree." "More detail can be found [here] (https://lskit-learn.org/modules"], 'markdown']" prior to the selected line of code in the modified computer-executable code.

Control may pass to end. Although the flowchart 500 is illustrated as discrete operations, such as 502, 504, 506, 508, and 510. However, in certain embodiments, such discrete operations may be further divided into additional operations, combined into fewer operations, or eliminated, depending on the particular implementation without detracting from the essence of the disclosed embodiments.

Figure 6:
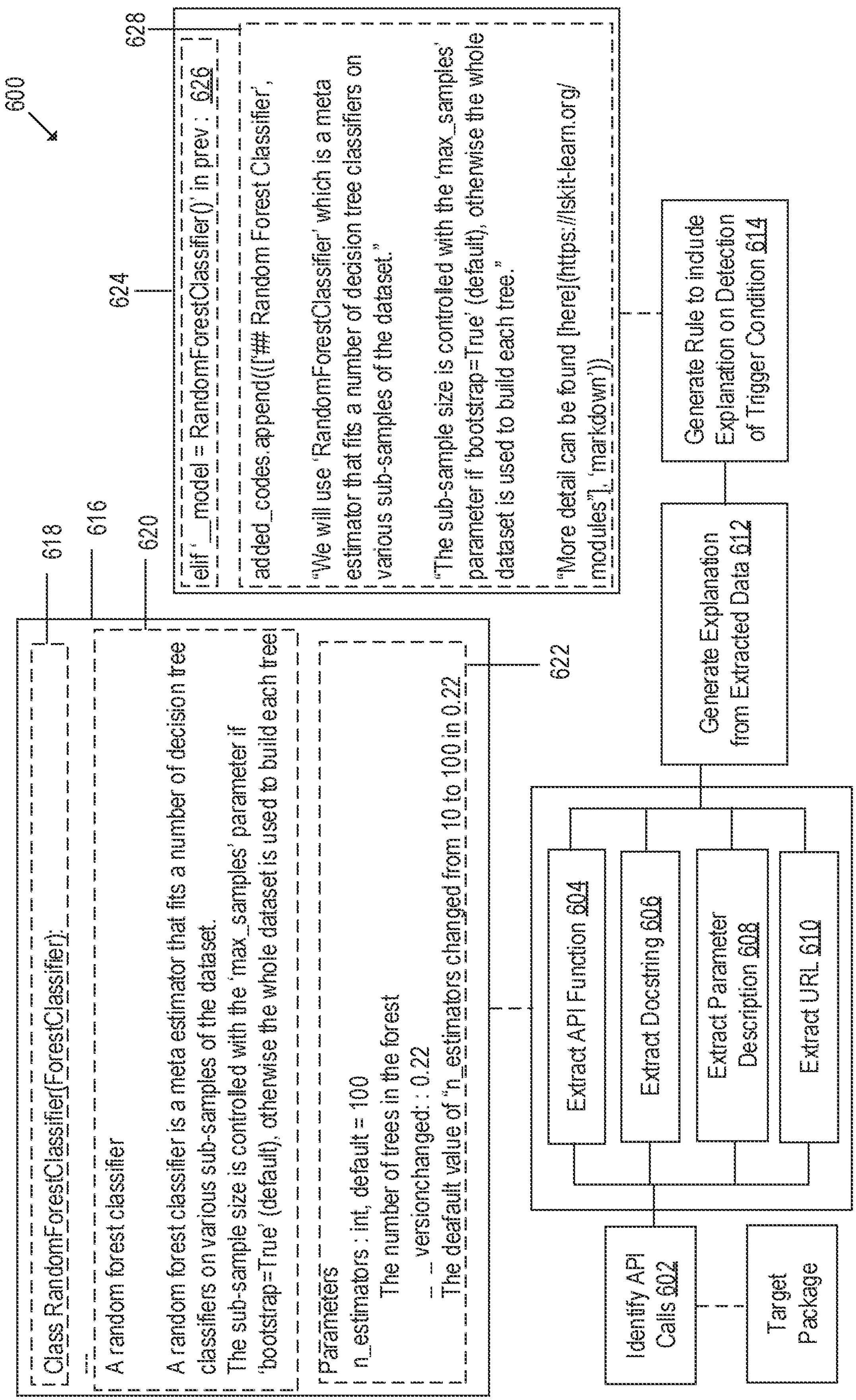
FIG. 6 illustrates an exemplary pipeline for automatic generation of a set of revision rules that may be used for updating code.

FIG. 6 illustrates an exemplary pipeline for automatic generation of a set of revision rules that may be used for updating code, according to at least one embodiment described in the present disclosure. FIG. 6 is explained in conjunction with elements from FIG. 1, FIG. 2, FIG. 3, FIG. 4, and FIG. 5. With reference to FIG. 6, there is shown there is shown a block diagram of an exemplary pipeline 600. The exemplary pipeline 600 may be used to automatically generate a set of rules. The set of rules may be used to update a modified computer-executable code or a non-executable description, based on a set of changes.

At 602, an API call may be identified from a target package. The processor 202 may be configured to identify the API call from the target package. The target package may be a code package included in a language source (code library). For example, the code package may include a documentation 616 related to an API call "Random Forest Classifier". The documentation 616 may include data related to API functions, docstring, parameter descriptions, URL links, and the like.

At 604, an API function 618 may be extracted. The processor 202 may be configured to extract the API function 618 associated with the API call "Random Forest Classifier" from the documentation 616.

At 606, a docstring 620 associated with the API function 618 may be extracted. The processor 202 may be configured to extract the docstring 620 associated with the API function 618 from the documentation 616.

At 608, a description of parameters 622 of the API function 618 may be extracted. The processor 202 may be configured to extract the description of parameters 622 of the API function 618 from the documentation 616.

At 610, a URL associated with the API function 618 may be extracted. The processor 202 may be configured to extract the URL associated with the API function Random Forest Classifier from the documentation 616.

At 612, an explanation may be generated based on the extracted data. The processor 202 may be configured to generate the explanation (summary) pertaining to the API call "Random Forest Classifier" based on the data extracted from the documentation 616. The extracted data includes the API function 618, the docstring 620, the description of parameters 622 of the API function 618, and the URL associated with the API function 618.

At 614, a rule 624 may be generated to include the explanation (summary) upon detection of a trigger condition in the modified computer-executable code. The processor 202 may be configured to generate the rule 624 to include the summary upon detection of the trigger condition in the modified computer-executable code. The generated rule 624 may include a template condition ['_model=RandomForestClassifier( )' in prev:] 626. If the trigger condition matches with the template condition ['_model=RandomForestClassifier( )' in prev:] 626, then the summary pertaining to the API call "Random Forest Classifier" may be included as an update to the non-executable description. The generated rule 624 may include a value 628 corresponding to the template condition 626. The value 628 may include an operation (append_prev) to be performed to update previous line of the non-executable description as a set of explanation strings. The summary may correspond to the set of explanation strings generated based on the extracted data.

Figure 7:
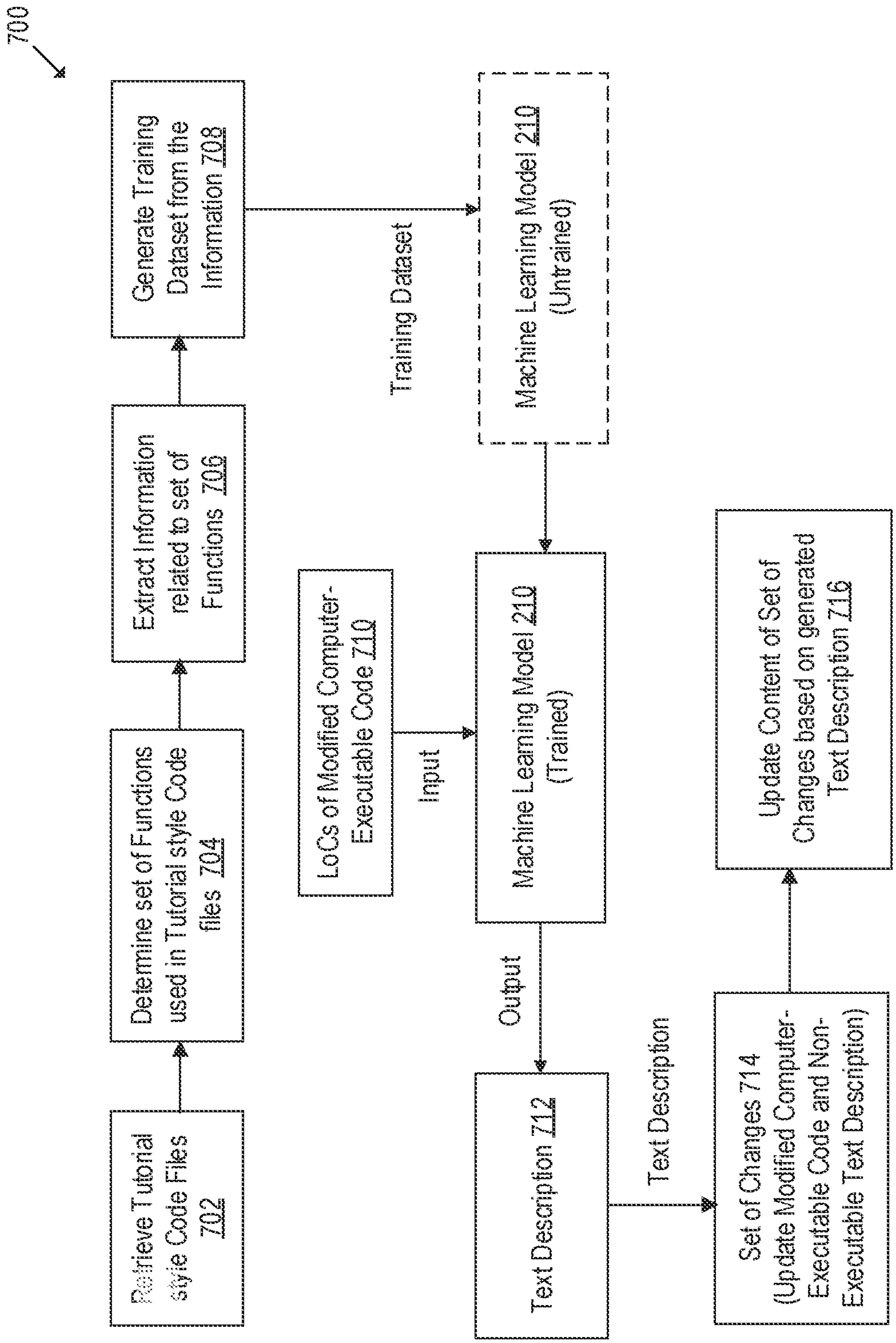
FIG. 7 is an exemplary pipeline for generation of text explanation to be included in updated code.

FIG. 7 is an exemplary pipeline for generation of text explanation to be included in updated code, according to at least one embodiment described in the present disclosure. FIG. 7 is explained in conjunction with elements from FIG. 1, FIG. 2, FIG. 3, FIG. 4, FIG. 5, and FIG. 6. With reference to FIG. 7, there is shown a block diagram of an exemplary pipeline 700, which includes the machine learning model 212 of FIG. 2. The machine learning model 212 may predict a text description 712 that may be included in a tutorial style code file as non-executable description. The text description 712 may also be used to update content of an updated non-executable description to be included in the tutorial style code file.

At 702, a plurality of tutorial-style code files associated with one or more online coding competitions may be received. The processor 202 may be configured to receive the plurality of tutorial-style code files associated with the one or more online coding competitions. The tutorial-style code files may be received from resources such as online discussion forums, datasets, context-free resources such as Wikipedia®, and so on. The resources may include metadata associated with code files, tutorials that explain the code files, sample solutions achieved using computer-executable code in the code files, performance of the sample solutions, and the like. The processor 202 may utilize the resources of the online coding competitions to train the machine learning model 212. Each received tutorial-style code file of the plurality of tutorial-style code files may include computer-executable codes, visualizations (inputs and outputs of each tutorial-style code file), non-executable descriptions (such as comments on lines of the computer-executable codes and descriptions of the lines of the computer-executable codes) for the computer-executable codes, and so on.

At 704, a set of functions used in the plurality of tutorial-style code files may be determined. The processor 202 may be configured to determine the set of functions used in the plurality of tutorial-style code files. In accordance with an embodiment, the set of functions may be determined based on ASTs of the plurality of tutorial-style code files. The determined set of functions may be unique functions which may be either absent in the template file or may have no corresponding description in the template files. The processor 202 may determine ASTs by parsing lines of the computer-executable codes in each of the plurality of tutorial-style code files. The computer-executable codes may include components such as function definitions, docstrings, function parameters, function descriptions, variables, code packages, and so on. An AST of a line of code in a tutorial-style code file may be used to determine one or more functions used in the tutorial-style code file. For example, for words such as 'seaborn' and 'sns', as included in a line of code "import seaborn as sns", the processor 202 may determine, based on AST, other lines of code that include the words 'seaborn' and 'sns'. An exemplary line of code is determined as: 'sns.heatmap(cm_mnb_tfidf, cmap="Blues", annot=True, fmt=")'. The AST may return 'True', since the line of code includes the word 'sns' as an alias for 'seaborn'. For another example line of code "import matplotlib.pyplot as plt", an AST may be parsed as "ast.parse(plt.figure (figsize=(10,10))\n)". The AST may return 'True' if functions such as 'plt.figure' and 'plt.show' are present in the line of code.

At 706, information related to the set of functions may be extracted. The processor 202 may be configured to extract the information related to the set of functions. Once the functions have been determined, the information related to the set of functions may be extracted. The extracted information may include computer-executable codes, descriptions of the computer-executable codes, comments on the lines of the computer-executable codes, and the like.

At 708, a training dataset may be generated based on the extracted information. The processor 202 may be configured to generate the training dataset based on the information related to the set of functions. The training dataset may be used to train the machine learning model 212. In accordance with an embodiment, the training dataset may be a numerical representation of code, comments, descriptions, and output included in the extracted information. An exemplary training dataset may include information components such as 000_simple-text-classification, _starter-intel-ai-4c6f, _the distribution-of-, and so on. Each of the information components may include parameters and values associated with the parameters. As an example, the parameters and values associated with information component 000_simple-text-classification include "no_markdown: 0", "no_markdown_header: 0", "no_code: 152, "no_code_comment: 23", "no_output: 19", "output: H", "user_name: mads2000", and so on.

Once the machine learning model 212 is trained by use of the training dataset, the processor 202 may provide lines of a modified computer-executable code 710 as input to the machine learning model 212. The trained machine learning model 212 may receive lines of the modified computer-executable code 710 as input. Exemplary lines of the modified computer-executable code 710 that may be provided to the trained machine learning model 212 are as follows:

```
1. train_df=pd.read_csv("../input/rsna-miccai-brain-tumor-radiogenomic-
   classification/train_labels.csv")
2. train_df
```

The machine learning model 212 may be configured to predict the text description 712 as output for the input. The predicted output (text description 712) corresponding to the exemplary input lines of the modified computer-executable code 710 may be as follows:

```
"train/- folder containing the training files, with each top-level folder
representing a subject"
"train_labels.csv- file containing the target MGMT_value for each
subject in the training data"
"test/- the test files, which use the same structure as train/; your task is to
predict the MGMT_value for each subject in the test data"
"sample_submission.csv- a sample submission file in the correct format"
```

At 716, the content of the set of changes 714 may be updated based on the text description 712. The processor 202 may update the content of the set of changes 714 based on the text description 712. The processor 202 may determine the set of changes 714 to update the modified computer-executable code and the non-executable description based on the set of changes. In some embodiments, the text description 712 may be included as one of the set of changes 714 that may be applicable to the non-executable description. In some embodiments, the text description 712 may be used to update content of one or more changes of the set of changes 714 that may be applicable to the non-executable description. The one or more changes may be determined based on trigger conditions in the non-executable description matching the template conditions in the set of rules. For example, the generated summary in the rule 624 may be updated based on the generated text description 712.

Figure 8A:
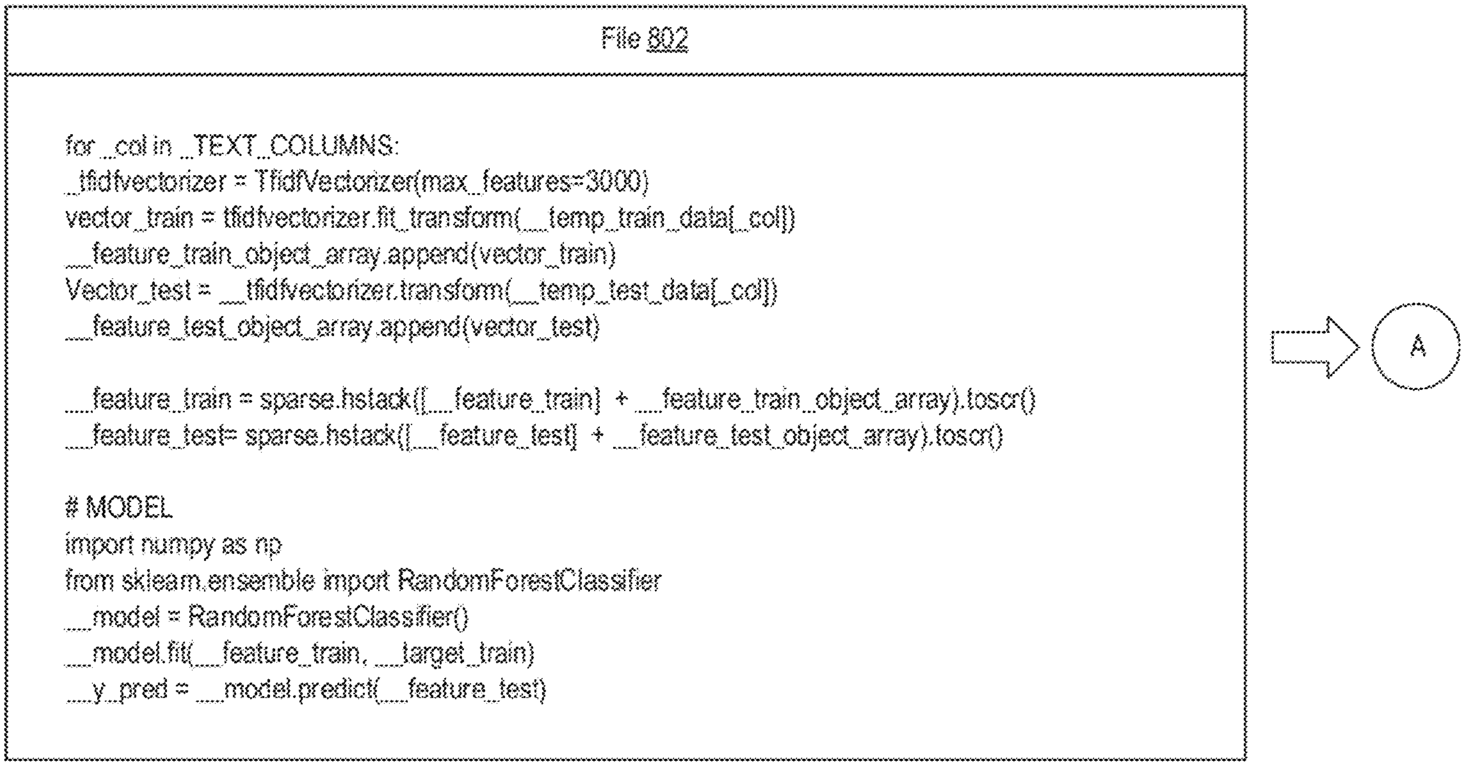
FIGS. 8A and 8B, collectively, illustrate an example generation of a tutorial style code file based on a file received from a code generation tool.
Figure 8B:
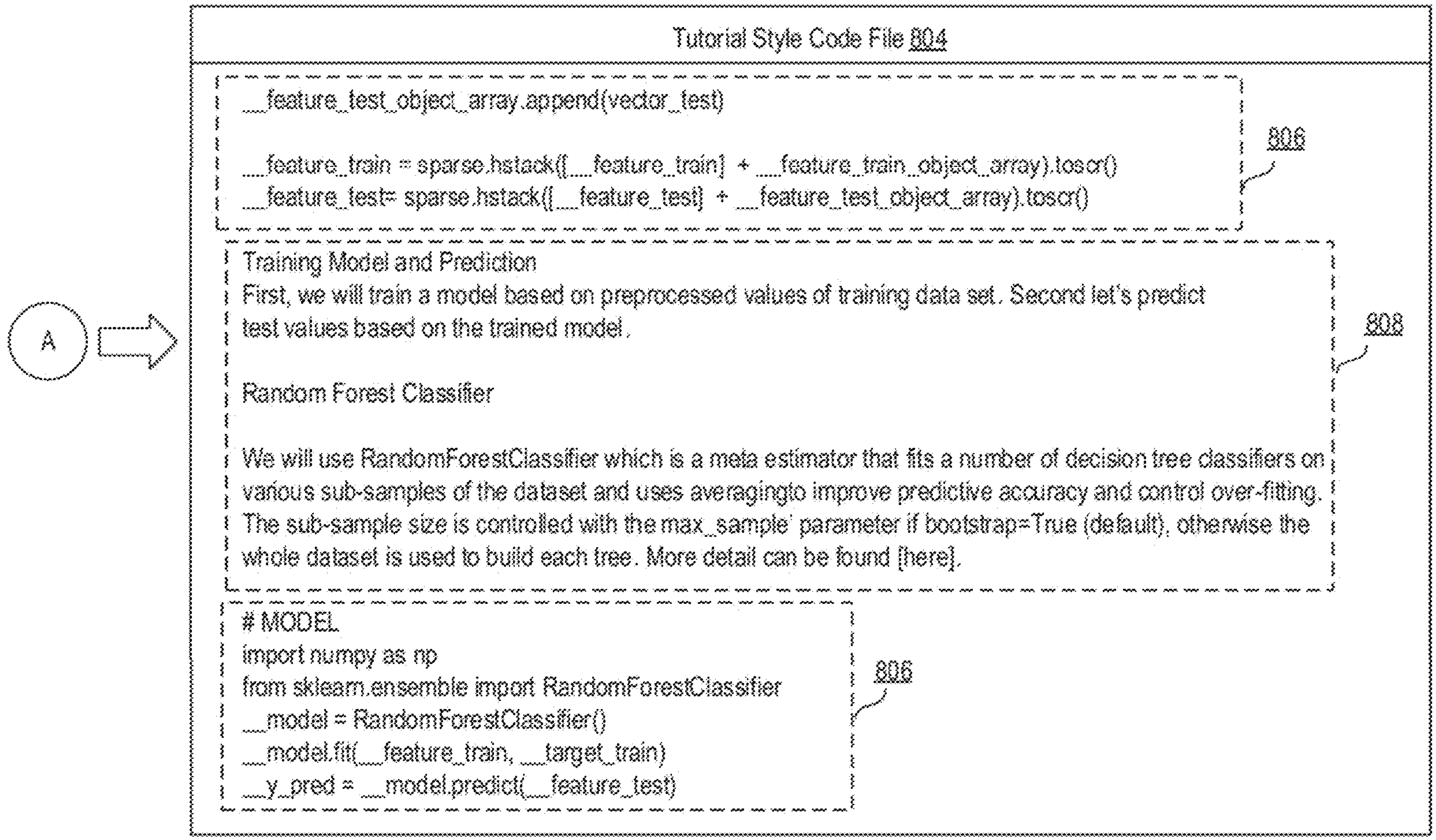

FIGS. 8A and 8B, collectively, illustrate an example generation of a tutorial style code file based on a file received from a code generation tool, according to at least one embodiment described in the present disclosure. FIGS. 8A and 8B are explained in conjunction with elements from FIG. 1, FIG. 2, FIG. 3, FIG. 4, FIG. 5, FIG. 6, and FIG. 7. With reference to FIG. 8A, there is shown a file 802. The file 802 may be received by the system 102 as an output of the code generation tool 110. With reference to FIG. 8B, there is shown a tutorial style code file 804 generated by the system 102 based on the file 802. The file 802 may include computer-executable code and non-executable description (static comments) associated with the computer-executable code. The tutorial style code file 804 includes a computer-executable code 806 and non-executable description 808. The computer-executable code 806 may an updated modified version of the computer-executable code included in the file 802. The processor 202 may be configured to perform operations to generate the tutorial style code file 804 based on the file 802.

The processor 202 may be configured to include the non-executable description 808 in the computer-executable code 806. The non-executable description 808 may be included based on a set of changes. Such changes may be determined based on a match between a trigger condition in the computer-executable code 806 and a template condition included in the set of rules. The trigger condition may be a function call included in the line of code of the computer-executable code 806. The line of code may be, for example, '_model=RandomForestClassifier( ) The template condition may be included in the rule 624, i.e., ['_model=RandomForestClassifier( )' in prev:] 626. As trigger condition is matching the template condition a set of changes may be determined. The set of changes may be based on a value that corresponds to the template condition 626. The value includes a portion of content of the value 628 in the rule 624. The value may include an operation and a text description. The set of changes may correspond to the operation 'append_prev' that may have to be performed on the selected line of code using a text description. The processor 202 may be configured to update the file 802 by appending the text description as an update to the non-executable description (comment # MODEL) in the file 802. The update may result in the generation of the tutorial style code file 804.

Various embodiments of the disclosure may provide one or more non-transitory computer-readable storage media configured to store instructions that, in response to being executed, cause a system (such as the system 102) to perform operations. The operations may include receiving, as an output of a code generation tool, a file that includes a computer-executable code and a non-executable description associated with the computer-executable code. The operations may further include modifying the computer-executable code by transforming blocks of the computer-executable code into modular code blocks. The operations may further include determining a set of trigger conditions from the modified computer-executable code and the non-executable description. The operations may further include matching the set of trigger conditions with template conditions included in a set of revision rules. The operations may further include determining, based on the match, a set of changes that is applicable to a portion of the modified computer-executable code and a portion of the non-executable description. The operations may further include updating the modified computer-executable code and the non-executable description, based on the set of changes. The operations may further include generating a tutorial-style code file that includes the updated computer-executable code and the updated non-executable description.

As indicated above, the embodiments described in the present disclosure may include the use of a special purpose or general-purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, executed by a processor, comprising:

receiving, as an output of a code generation tool, a file that includes a computer-executable code and a non-executable description associated with the computer-executable code;

segmenting the computer-executable code into a plurality of blocks;

modifying the computer-executable code by transforming each of the plurality blocks of the computer-executable code into a modular code block, wherein the plurality of blocks of the of the computer-executable code are transformed into the modular code blocks representing content of each of the plurality of blocks of the computer-executable code through a function definition and function call;

determining, from the modified computer-executable code and the non-executable description, at least one of variables, function calls and function parameters as a set of trigger conditions;

determining whether at least one trigger condition for the modified computer-executable code and at least one trigger condition for the non-executable description among the set of trigger conditions that matches with a respective template condition among the template conditions included in a set of revision rules, wherein the set of revision rules corresponds to a template file that includes the template conditions as variables, function calls, or function parameters, and values corresponding to the template conditions, the values being names of functions that need to be called;

if a match is determined between the at least one trigger condition and the respective template condition, identifying, based on the match, a value corresponding to the matching template condition for each of the at least one trigger condition;

searching code packages to identify Application Programing Interface (API) calls used in the code packages;

extracting data related to the API calls from the code package, wherein the extracted data includes one or more of API functions, docstrings, parameter descriptions, and URLs associated with the API functions;

summarizing the extracted data into a set of explanation strings associated with the API functions;

generating a revision rule of the set of revision rules based on the set of explanation strings;

updating, based on the set of revision rules, both the modified computer-executable code and the non-executable description with a function description of the function represented by each identified value; and generating a tutorial-style code file that includes the updated modified computer-executable code and the updated non-executable description, the updated non-executable description includes additional explanation text that was not provided before the updating within the tutorial-style code file describing the updated modified computer-executable.

2. The method according to claim 1, wherein the code generation tool is a machine learning code generation software that, when executed, generates the file, and wherein the computer-executable code of the file is associated with a machine learning task.

3. The method according to claim 1, wherein the non-executable description corresponds to static comments or annotations associated with respective portions of the computer-executable code.

4. The method according to claim 1, wherein the set of trigger conditions comprises one or more of variables, keywords, function calls, function parameters, decorators, Unicode text, and software package names.

5. The method according to claim 1, wherein the blocks of the computer-executable code are transformed into the modular code blocks by representing content of each of the blocks as at least one of:

the function call, a function description, and one or more parameters of the function definition.

6. The method according to claim 1, wherein the set of revision rules correspond to a template file that includes the template conditions as keys, and values corresponding to the keys.

7. The method according to claim 1, further comprising:

parsing lines of the modified computer-executable code to generate an Abstract Syntax Tree (AST);

determining the set of trigger conditions by processing nodes of the AST; and wherein the updating includes injecting lines of code (LOCs) that are to be injected inside or outside the modular code blocks, and textual descriptions that explain or describe the LOCs.

8. The method according to claim 1, further comprising:

selecting a line of code (LOC) from the modified computer-executable code; and matching the respective trigger condition among the set of trigger conditions included in the selected LOC with the template conditions, wherein the updating includes one of:

a first operation to replace the selected LOC with one or more LOCs that are different from the selected LOC, a second operation to delete the selected LOC, a third operation to insert the one or more LOCs before the selected LOC, a fourth operation to insert the one or more LOCs after the selected LOC, and a fifth operation to append the one or more LOCs at a beginning or an end of the selected LOC.

9. The method according to claim 1, wherein the set of revision rules include one or more of human-generated rules and machine-generated rules.

10. The method according to claim 1, further comprising:

retrieving a plurality of tutorial-style code files associated with one or more online coding competitions;

determining a set of functions used in the plurality of tutorial-style code files, based on ASTs of the plurality of tutorial-style code files;

extracting information related to the set of functions from the plurality of tutorial-style code files, wherein the information includes computer-executable codes, explanations, and comments;

generating a training dataset based on the extracted information; and training a machine learning model on a sequence-to-sequence generated task, based on the training dataset.

11. The method according to claim 10, further comprising:

providing one or more lines of code (LOCs) of the modified computer-executable code as an input to the trained machine learning model;

generating a text description as an output of the trained machine learning model for the input; and the updating updates the generated text description.

12. The method according to claim 1, further comprising:

populating a baseline tutorial-style code template with the updated computer-executable code and the updated non-executable description to generate the tutorial-style code file; and controlling a display device to render the generated tutorial-style code file.

13. The method accordingly to claim 1, wherein at least one of the set of revision rules is automatically generated from the set of explanation strings associated with the API functions.

14. A non-transitory computer-readable storage medium configured to store instructions that, in response to being executed, causes a system to perform operations, the operations comprising:

receiving, as an output of a code generation tool, a file that includes a computer-executable code and a non-executable description associated with the computer-executable code;

segmenting the computer-executable code into a plurality of blocks;

modifying the computer-executable code by transforming each of the plurality blocks of the computer-executable code into a modular code block, wherein the plurality of blocks of the of the computer-executable code are transformed into the modular code blocks representing content of each of the plurality of blocks of the computer-executable code through a function definition and function call;

determining, from the modified computer-executable code and the non-executable description, at least one of variables, function calls and function parameters as a set of trigger conditions;

determining whether at least one trigger condition for the modified computer-executable code and at least one trigger condition for the non-executable description among the set of trigger conditions that matches with a respective template condition among the template conditions included in a set of revision rules, wherein the set of revision rules corresponds to a template file that includes the template conditions as variables, function calls, or function parameters, and values corresponding to the template conditions, the values being names of functions that need to be called;

if a match is determined between the at least one trigger condition and the respective template condition, identifying, based on the match, a value corresponding to the matching template condition for each of the at least one trigger condition;

searching code packages to identify Application Programming Interface (API) calls used in the code packages;

extracting data related to the API calls from the code packages, wherein the extracted data includes one or more of API functions, docstrings, parameter descriptions, and URLs associated with the API functions;

summarizing the extracted data into a set of explanation strings associated with the API functions;

generating a revision rule of the set of revision rules based on the set of explanation strings;

updating, based on the set of revision rules, both the modified computer-executable code and the non-executable description with a function description of the function represented by each identified value; and generating a tutorial-style code file that includes the updated modified computer-executable code and the updated non-executable description, the updated non-executable description includes additional explanation text that was not provided before the updating within the tutorial-style code file describing the updated modified computer-executable.

15. The non-transitory computer-readable storage medium according to claim 14, wherein the set of revision rules correspond to a template file that includes the template conditions as keys and values corresponding to the keys.

16. The non-transitory computer-readable storage medium according to claim 15, wherein the operations comprise:

parsing lines of the modified computer-executable code to generate an Abstract Syntax Tree (AST);

determining the set of trigger conditions by processing nodes of the AST; and wherein the updating includes injecting lines of code (LOCs) that are to be injected inside or outside the modular code blocks, and textual descriptions that explain or describe the LOCs.

17. The non-transitory computer-readable storage medium according to claim 14, wherein the operations comprise:

selecting a line of code (LOC) from the modified computer-executable code; and matching the respective trigger condition among the set of trigger conditions included in the selected LOC with the template conditions, wherein the updating includes one of:

a first operation to replace the selected LOC with one or more LOCs that are different from the selected LOC, a second operation to delete the selected LOC, a third operation to insert the one or more LOCs before the selected LOC, a fourth operation to insert the one or more LOCs after the selected LOC, and a fifth operation to append the one or more LOCs at a beginning or an end of the selected LOC.

18. A system, comprising:

a processor configured to:

receive, as an output of a code generation tool, a file that includes a computer-executable code and a non-executable description associated with the computer-executable code;

segment the computer-executable code into a plurality of blocks;

modify the computer-executable code by transforming each of the plurality blocks of the computer-executable code into a modular code block, wherein the plurality of blocks of the of the computer-executable code are transformed into the modular code blocks representing content of each of the plurality of blocks block of the computer-executable code through a function definition and function call;

determine, from the modified computer-executable code and the non-executable description, at least one of variables, function calls and function parameters as a set of trigger conditions;

determine whether at least one trigger condition for the modified computer-executable code and at least one trigger condition for the non-executable description among the set of trigger conditions that matches with a respective template condition among the template conditions included in a set of revision rules, wherein the set of revision rules corresponds to a template file that includes the template conditions as variables, function calls, or function parameters, and values corresponding to the template conditions, the values being names of functions that need to be called;

if a match is determined between the at least one trigger condition and the respective template condition, identify, based on the match, a value corresponding to the matching template condition for each of the at least one trigger condition;

search code packages to identify Application Programming Interface (API) calls used in the code packages;

extract data related to the API calls from the code packages, wherein the extracted data includes one or more of API functions, docstrings, parameter descriptions, and URLs associated with the API functions;

summarize the extracted data into a set of explanation strings associated with the API functions;

generate a revision rule of the set of revision rules based on the set of explanation strings;

update, based on the set of revision rules, both the modified computer-executable code and the non-executable description with a function description of the function represented by each identified value; and generate a tutorial-style code file that includes the updated modified computer-executable code and the updated non-executable description, the updated non-executable description includes additional explanation text that was not provided before the updating within the tutorial-style code file describing the updated modified computer-executable.

* * * * *